(12) United States Patent
Blanc et al.

(10) Patent No.: US 7,477,685 B2
(45) Date of Patent: *Jan. 13, 2009

(54) METHOD AND SYSTEMS FOR ANALYZING THE QUALITY OF HIGH-SPEED SIGNALS

(75) Inventors: Alain Blanc, Tourrettes sur Loup (FR); Patrick Jeanniot, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/774,572

(22) Filed: Jul. 7, 2007

(65) Prior Publication Data

US 2008/0013615 A1 Jan. 17, 2008

Related U.S. Application Data

(63) Continuation of application No. 10/697,495, filed on Oct. 30, 2003, now Pat. No. 7,260,145.

(30) Foreign Application Priority Data

Dec. 19, 2002 (EP) .................................. 02368143

(51) Int. Cl.
*H04B 3/46* (2006.01)
*H04Q 1/20* (2006.01)

(52) U.S. Cl. ........................................ 375/224; 702/69
(58) Field of Classification Search ................ 375/224, 375/340–343, 355, 360, 369, 371, 377; 702/69, 702/84

See application file for complete search history.

(56) References Cited

U.S. PATENT DOCUMENTS

| 4,029,904 | A |   | 6/1977  | Papeschi            |
|-----------|---|---|---------|---------------------|
| 4,059,825 | A |   | 11/1977 | Greene              |
| 4,320,526 | A |   | 3/1982  | Gitlin              |
| 4,807,171 | A | * | 2/1989  | Gale ......... 708/200 |
| 5,023,892 | A |   | 6/1991  | Stoica              |
| 5,333,147 | A |   | 7/1994  | Nohara et al.       |
| 5,550,766 | A |   | 8/1996  | Al-Zamil            |
| 5,598,439 | A |   | 1/1997  | Wagner              |

(Continued)

OTHER PUBLICATIONS

Schreiner et al, Automatic Distortion Correction for Efficiency Pulse Transmission, IBM Journal, Jan. 1985, pp. 20-30.

*Primary Examiner*—Jean B Corrielus
(74) *Attorney, Agent, or Firm*—Joscelyn G. Cockburn; Patrick J. Daugherty; Driggs, Hogg, Daugherty & Del Zoppo Co., LPA

(57) ABSTRACT

Methods and systems for analyzing the quality of high-speed signals are provided, wherein a high speed signal is sampled simultaneously a plurality of times during a sampling clock period at each of a plurality of phase rotator positions to generate a plurality of partial values, wherein subset pluralities of the partial values are associated to phase rotator positions. The partial values are combined into a global value which is analyzed to determine a quality of the high speed signal. Phase rotator behavior may also be analyzed to determine signal quality. A best position to lock a phase rotator when determining signal quality may be determined from a graphic characterization of a phase rotator position distribution.

10 Claims, 8 Drawing Sheets

U.S. PATENT DOCUMENTS

| | | |
|---|---|---|
| 5,909,520 A | 6/1999 | Garcia |
| 6,038,267 A | 3/2000 | Oura et al. |
| 6,347,128 B1 * | 2/2002 | Ransijn ................ 375/376 |
| 7,151,810 B2 * | 12/2006 | Franca-Neto ............ 375/355 |
| 2002/0009170 A1 * | 1/2002 | Schmatz ................ 375/371 |
| 2002/0031198 A1 * | 3/2002 | Eglit ..................... 375/355 |
| 2004/0066867 A1 * | 4/2004 | Fujimori et al. ......... 375/348 |
| 2007/0002990 A1 * | 1/2007 | Lee et al. ............... 375/355 |

* cited by examiner 300-1 — 0 0 0 0 1 1 1 1 1 1 1 1 1 1 1 1 1 1 1 1 1 1 1 1 1 1 1 1 1 1 1 1 1 1 0 0 0 0 0 0
305-1 — 0 0 0 0 1 1 1 1 1 1 1 1 1 1 1 1 1 1 1 1 1 1 1 1 1 1 1 1 1 1 1 1 1 1 0 0 0 0 0 0

XOR . 0 0 0 1 0 0 0 0 0 0 0 0 0 0 0 0 0 0 0 0 0 0 0 0 0 0 0 0 0 0 0 0 0 1 0 0 0 0 0 .
310-1

300-2 — 0 0 0 1 1 1 1 1 1 1 1 1 1 1 1 1 1 1 1 1 1 1 1 1 1 1 1 1 1 1 1 1 1 1 1 0 0 0 0 0
305-2 — 0 0 0 1 1 1 1 1 1 1 1 1 1 1 1 1 1 1 1 1 1 1 1 1 1 1 1 1 1 1 1 1 1 1 1 0 0 0 0 0

XOR . 0 0 1 0 0 0 0 0 0 0 0 0 0 0 0 0 0 0 0 0 0 0 0 0 0 0 0 0 0 0 0 0 0 0 1 0 0 0 0 .
310-2

300-3 — 1 1 0 0 0 0 0 0 0 0 0 0 0 0 0 0 0 0 0 0 0 0 0 0 0 0 0 0 0 0 0 0 0 1 1 1 1 1 1 1
305-3 — 1 1 0 0 0 0 0 0 0 0 0 0 0 0 0 0 0 0 0 0 0 0 0 0 0 0 0 0 0 0 0 0 0 1 1 1 1 1 1 1

XOR . 0 1 0 0 0 0 0 0 0 0 0 0 0 0 0 0 0 0 0 0 0 0 0 0 0 0 0 0 0 0 0 0 1 0 0 0 0 0 0 .
310-3

300-4 — 0 0 0 0 1 1 1 1 1 1 1 1 1 1 1 1 1 1 1 1 1 1 1 1 1 1 1 1 1 1 1 1 1 0 0 0 0 0 0 0
305-4 — 0 0 0 0 1 1 1 1 1 1 1 1 1 1 1 1 1 1 1 1 1 1 1 1 1 1 1 1 1 1 1 1 1 0 0 0 0 0 0 0

XOR . 0 0 0 1 0 0 0 0 0 0 0 0 0 0 0 0 0 0 0 0 0 0 0 0 0 0 0 0 0 0 0 0 1 0 0 0 0 0 0 .
310-4

. . .

300-n — 0 0 0 0 1 1 1 1 1 1 1 1 1 1 1 1 1 1 1 1 1 1 1 1 1 1 1 1 1 1 1 1 1 1 1 0 0 0 0 0
305-n — 0 0 0 0 1 1 1 1 1 1 1 1 1 1 1 1 1 1 1 1 1 1 1 1 1 1 1 1 1 1 1 1 1 1 1 0 0 0 0 0

XOR . 0 0 0 1 0 0 0 0 0 0 0 0 0 0 0 0 0 0 0 0 0 0 0 0 0 0 0 0 0 0 0 0 0 0 1 0 0 0 0 .
310-n

315 — . 0 0 0 1 0 0 0 0 0 0 0 0 0 0 0 0 0 0 0 0 0 0 0 0 0 0 0 0 0 0 0 0 0 1 0 0 0 0 0 .

. 0 0 0 1 0 0 0 0 0 0 0 0 0 0 0 0 0 0 0 0 0 0 0 0 0 0 0 0 0 0 0 0 0 1 0 0 0 0 0 .
. 0 0 1 0 0 0 0 0 0 0 0 0 0 0 0 0 0 0 0 0 0 0 0 0 0 0 0 0 0 0 0 0 0 1 0 0 0 0 .

OR . 0 0 1 1 0 0 0 0 0 0 0 0 0 0 0 0 0 0 0 0 0 0 0 0 0 0 0 0 0 0 0 0 0 1 1 0 0 0 0 .

. 0 0 1 1 0 0 0 0 0 0 0 0 0 0 0 0 0 0 0 0 0 0 0 0 0 0 0 0 0 0 0 0 0 1 1 0 0 0 0 .
. 0 1 0 0 0 0 0 0 0 0 0 0 0 0 0 0 0 0 0 0 0 0 0 0 0 0 0 0 0 0 0 0 1 0 0 0 0 0 0 .

OR . 0 1 1 1 0 0 0 0 0 0 0 0 0 0 0 0 0 0 0 0 0 0 0 0 0 0 0 0 0 0 0 0 1 1 1 0 0 0 0 .

. 0 1 1 1 0 0 0 0 0 0 0 0 0 0 0 0 0 0 0 0 0 0 0 0 0 0 0 0 0 0 0 0 1 1 1 0 0 0 0 .
. 0 0 0 1 0 0 0 0 0 0 0 0 0 0 0 0 0 0 0 0 0 0 0 0 0 0 0 0 0 0 0 0 0 1 0 0 0 0 0 .

OR . 0 1 1 1 1 0 0 0 0 0 0 0 0 0 0 0 0 0 0 0 0 0 0 0 0 0 0 0 0 0 0 0 1 1 1 0 0 0 0 .

. . .

. 0 1 1 1 1 0 0 0 0 0 0 0 0 0 0 0 0 0 0 0 0 0 0 0 0 0 0 0 0 0 0 0 1 1 1 0 0 0 0 .
. 0 0 0 1 0 0 0 0 0 0 0 0 0 0 0 0 0 0 0 0 0 0 0 0 0 0 0 0 0 0 0 0 0 0 1 0 0 0 0 .

OR . 0 1 1 1 1 0 0 0 0 0 0 0 0 0 0 0 0 0 0 0 0 0 0 0 0 0 0 0 0 0 0 0 1 1 1 0 0 0 0 .

— 315

|← L₁ →|←————— L₂ —————→|
320 — xxxxxx ———————————————— xxxxx —

PRIOR ART
Figure 3

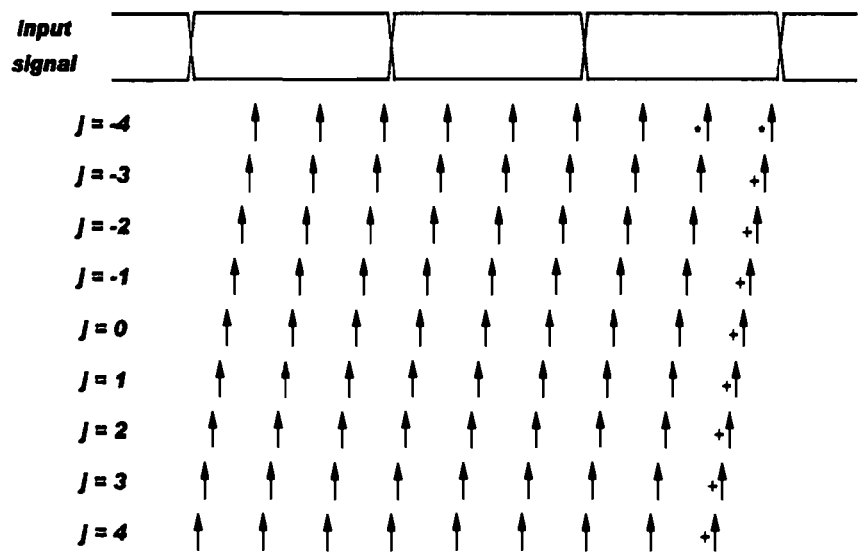
Figure 7a
| Pos./Bit | 0 | 1 | 2 | 3 | 4 | 5 | 6 | 7 | 8 |
|---|---|---|---|---|---|---|---|---|---|
| j = -4 | 1 | 1 | 0 | 0 | 1 | 0 | 1 | 1 | 0 |
| j = -3 | 1 | 1 | 0 | 0 | 1 | 0 | 1 | 1 | 0 |
| j = -2 | 1 | 1 | 0 | 0 | 1 | 0 | 1 | 1 | 0 |
| j = -1 | 1 | 1 | 0 | 0 | 1 | 0 | 1 | 1 | 0 |
| j = 0 | 1 | 1 | 0 | 0 | 1 | 0 | 1 | 1 | 0 |
| j = 1 | 0 | 1 | 1 | 0 | 1 | 0 | 0 | 1 | 1 |
| j = 2 | 0 | 1 | 1 | 0 | 1 | 1 | 0 | 1 | 1 |
| j = 3 | 0 | 1 | 1 | 0 | 1 | 1 | 0 | 1 | 1 |
| j = 4 | 0 | 1 | 1 | 0 | 1 | 1 | 0 | 1 | 1 |
Figure 7b
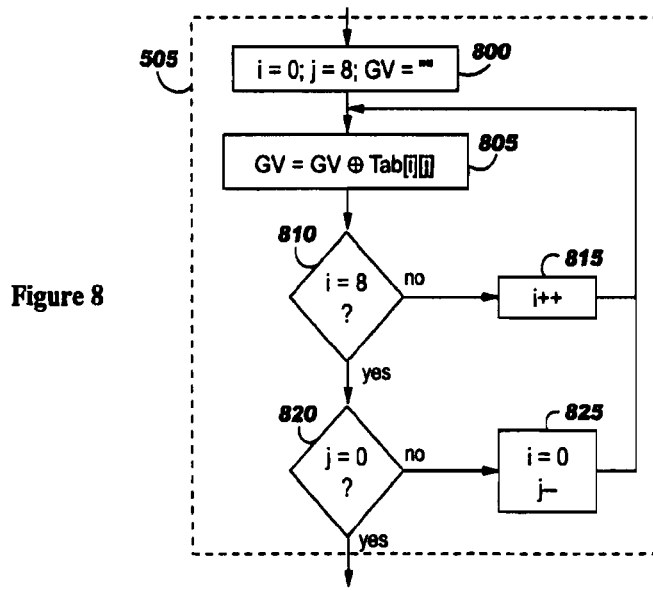
Figure 8

METHOD AND SYSTEMS FOR ANALYZING THE QUALITY OF HIGH-SPEED SIGNALS

CROSS REFERENCE TO RELATED APPLICATION

This application is a continuation of application Ser. No. 10/697,495, filed Oct. 30, 2003, now U.S. Pat. No. 7,260,145, issued Aug. 21, 2007, which claims priority of EP Ser. No. 02368143.0, filed Dec. 19, 2002.

DESCRIPTION OF THE INVENTION

1. Field of the Invention

The present invention relates generally to signal analysis and more specifically to a method and systems for analyzing the quality of high-speed signals.

2. Background of the Invention

The rate at which data are transmitted through communication networks has dramatically increased in recent years. Fueled by progresses achieved in fiber and optoelectronic devices and techniques such as DWDM (Dense Wavelength Division Multiplexing), which allows multiplying the bandwidth of a single fiber by merging many wavelengths on it. Telecommunications and networking industry had to develop devices capable of routing and switching the resulting huge amount of data that converges, to be dispatched, at each network node. Typically, routers and switches situated at those network nodes have now to cope with the requirement of having to move data at aggregate rates that must be expressed in hundredths of giga ($10^9$) bits per second while multi tera ($10^{12}$) bits per second rates must be considered for the new devices under development.

If considerable progress have been made in optoelectronic, allowing this level of performances in the transport of data from node to node, it remains that switching and routing of the data is still done in the electrical domain at each network node. This, essentially, because there is no optical memory available yet that would permit storing temporarily the frames of transmitted data while they are examined to determine their final destination. This must still be done in the electrical domain using the traditional semiconductor technologies and memories.

Improvements in semiconductor processes are making possible integrated circuits of increasing size and complexity. As a consequence, since the clock rates reach very high frequency, signals carrying data must be of high quality to detect logic levels. A standard solution for analyzing the quality of received signals consists in visualizing the eye diagram of measurement of a transmitted train of signals. By the level of opening in the diagram it becomes easy to appreciate the quality of the transmitted information, as illustrated on FIGS. 1a and 1b. The more the "eye" closes, the more difficult is the capability to understand if the switching transition has taken place or if the shift of the signal baseline is due to background noise. However, due to the clock rate, oscilloscopes require for such measurements are very expensive and, thus, are generally not used in real environments to test system efficiency but only in development laboratories. Moreover, the receiver must be removed during such measurements to avoid signal perturbations.

Another solution consists in over-sampling the high-speed received signal and accumulating results so as to determine where transitions take place. High-speed signal receivers are often based upon an over-sampling mechanism used to analyze signal transitions so as to determine the signal clock and thus, the best bit sampling position. This mechanism may be used to analyze the quality of the high-speed received signal. FIGS. 2 and 3 illustrate such solution. As shown on FIG. 2, a signal having a period $P_1$ may be sampled by a system based on a clock having a period $P_2$ smaller than $P_1$, in this example, $P_2 = P_1/30$. Sampled points are memorized in a register, for example a 40 bit register. FIG. 3 represents an example illustrating this known method. At time i, a first set of sampled points 300-1 is memorized in the above mentioned 40 bit register and an XOR operation is performed between these sampled points and the same set shifted 1 bit to the right, referred to as 305-1, to obtain result 310-1 characterizing the signal transition location. Result 310-1 is memorized in a 39 bit register. Signal transitions took place where a bit equal to 1 has been found. Then, at time i+1, a new set of sampled points 300-2 is memorized in the same 40 bit register and the XOR operation is performed between these sampled points and the same set shifted 1 bit to the right, referred to as 305-2, to obtain result 310-2. An OR operation is performed on this result 310-2 and the value stored in the 39 bit register. The OR result is stored in the 39 bit register, replacing the previous result. Then, the process is repeated at time i+2, and so on. At the end of the process, the value 315 stored in the 39 bit register characterizes the quality of the high-speed received signal by showing all the positions wherein the signal transitions took places. This value may be transformed so as to be easier to analyze. Such a transformation may consist, for example, in replacing the 0 by "-" and the 1 by ".times." as illustrated by reference 320. In the following description, this representation is referred to as a digital eye. Thus, the ratio of the number $L_2$ of "-" with the number $L_1$ of ".times." characterizes the quality of the high-speed received signal. It is to be noticed that the process must run during a sufficient period to analyze an important number of signal transitions.

To use efficiently this method, the clock rate of the signal must be a multiple of the clock rate of the sampling system and the ratio of these clock rates must be large enough. As a consequence, it can not be used to analyze system wherein the clock rate is such that it is not possible to sample points with an adequate clock rate due to technology limits. For example, considering a data communication link running at 2.5 Gbps, sampling 30 values per clock period means that a value must be sampled each 13.3 ps. Such sampling rate may not be reached at reasonable cost when considering the required accuracy of clock shift and the latch power consumption.

There is thus a need for a method and systems adapted to analyze the quality of high-speed signal when the clock rate of the sampling system does not allow to over-sample the signal.

SUMMARY OF THE INVENTION

Thus, it is a broad object of the invention to remedy the shortcomings of the prior art as described here above.

It is another object of the invention to provide a method and systems adapted to analyze the quality of high-speed signals. Referring now to FIG. 13, in one aspect methods and systems are provided wherein at 1302 a high speed signal is sampled simultaneously a plurality of times during a sampling clock period at each of a plurality of phase rotator positions to generate a plurality of partial values, wherein subset pluralities of the partial values are associated to phase rotator positions. At 1304 the partial values are combined into a global value which is analyzed at 1306 to determine a quality of the high speed signal. Phase rotator behavior may also be analyzed at 1308 to determine signal quality at 1306. A best position to lock a phase rotator when determining signal quality may be determined at 1310 from a graphic characterization of a phase rotator position distribution at 1312.

It is a further object of the invention to provide a method and systems adapted to analyze the quality of high-speed signals in real conditions without perturbing the signal receiver.

The accomplishment of these and other related objects is achieved by a method for analyzing the quality of a high speed signal by using a sampler controlled by a phase rotator having at least two positions, said sampler being adapted for sampling simultaneously at least three bits, said method comprising the steps of:

setting said phase rotator in a first position;

initializing a partial value associated to said phase rotator position;

sampling said high speed signal;

XORing said sample and said sample shifted by 1 bit;

ORing the result of said XOR operation with said partial result associated to said phase rotator position;

replacing the value of said partial result associated to said phase rotator position by the result of said OR operation;

repeating the last four steps during a predetermined time setting said phase rotator in a second position and repeating the last six steps; and, combining said partial results associated to said first and second positions, wherein the combination of said partial results characterizes the quality of said high speed signal, values equal to a first logical state corresponding to locations wherein none signal transition took place and values equal to a second logical state characterizing locations wherein signal transitions have been detected.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 1, comprising FIG. 1a represents a close eye wherein a switching transition is not easy to distinguish from background noise and FIG. 1b represents an open eye illustrating a switching transition.

FIG. 2 and FIG. 3 illustrate a standard method for analyzing the quality of a high-speed signal by over-sampling.

FIG. 7, comprising FIGS. 7a and 7b, illustrates the data acquisition and formatting principles that are used-by the method of the invention.

FIG. 8 represents an example of the algorithm used to format acquired data.

DETAILED DESCRIPTION OF THE PREFERRED EMBODIMENT

According to the method of the invention, the high speed signal to be analyzed is virtually over-sampled by using a sampler controlled by a phase rotator. Such virtual over-sampling, or time over-sampling, allows increasing, artificially, the number of signal sampling positions per clock period. Thus, even though only n values may be simultaneously sampled, the use of a phase rotator having p positions corresponding to p-1 phase shifts of the sampler clock, allows virtually sampling n.times.p values, corresponding to n.times.p different positions. To that end, n values are simultaneously sampled for each of the p positions of the sampler clock phase and combined so as to obtain a "digital eye". If such method can not be used to analyze the signal values (sampling is performed on different clock period of the signal), it may be used efficiently to analyze the positions wherein signal transitions take place. Thus, the combination of the n values sampled for each of the p positions of the sampler clock phase characterizes n.times.p signal positions wherein signal transitions are analyzed. For example, considering a data communication link running at 2.5 Gbps, a sampling clock of 1.25 GHz, a 6 bits sampler and a phase rotator having 9 positions, the method of the invention simulates a sampling of 27 values per signal bit, i.e. a sampling each 14.8 ps. Such method looks like analyzing the view through a window comprising n holes used to observe a fixed signal, while moving the window to p positions.

For sake of illustration, the following description is based upon the receiver of an HSS system. However, the method and systems of the invention may be used for analyzing any high-speed signal that can not be over-sampled.

Figure 1A:
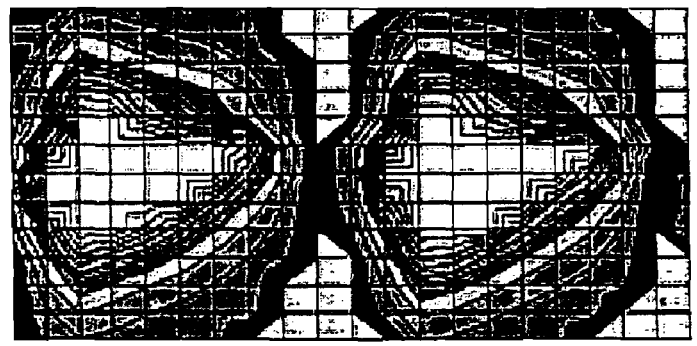
FIGS. 1a and 1b, is an example of eye-diagrams illustrating the transmission of a signal.
Figure 1B:
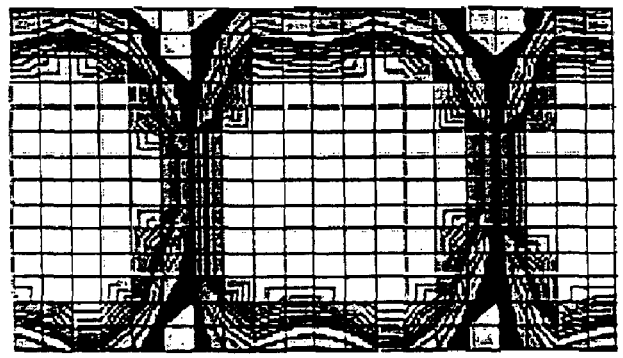
Figure 2:
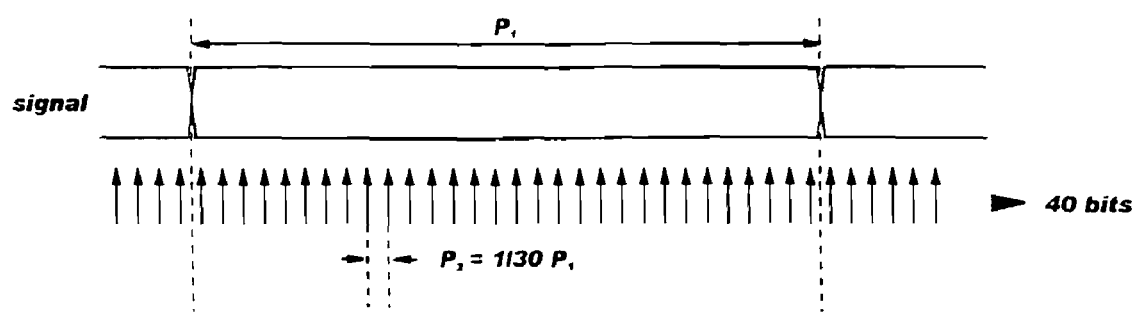
Figure 4:
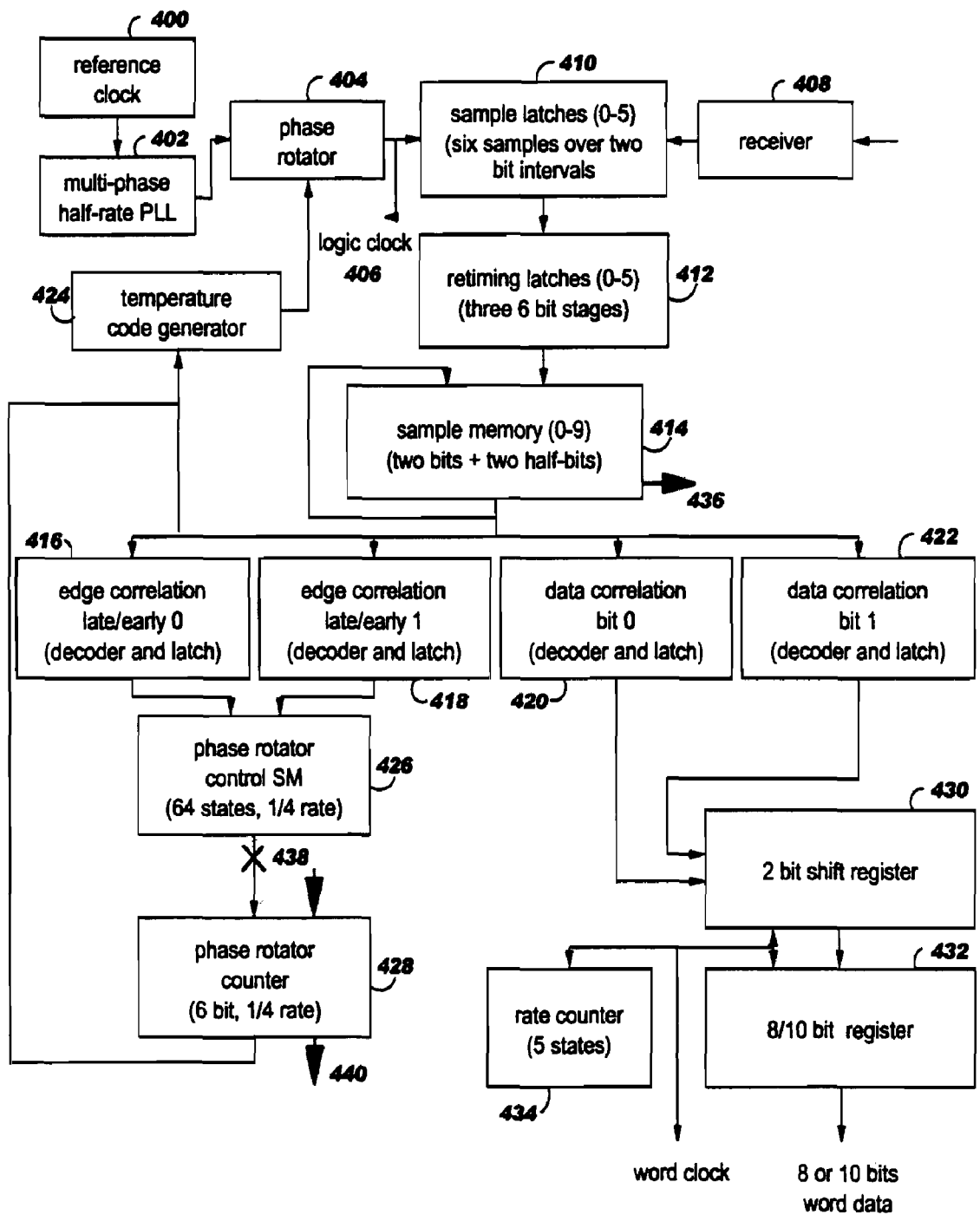
FIG. 4 illustrates the architecture of the receiver of an HSS macro with which the method of the invention may be used.

FIG. 4 illustrates a block diagram of the receiver architecture described in U.S. Patent Application No. 2002/0094055, now U.S. Pat. No. 6,970,529 issued Nov. 29, 2005. A PLL 402 receives a signal from a reference clock 400. The PLL controls a voltage controlled three-stage ring oscillator (VCO) running at half the bit frequency. The PLL is shared with four receivers, one, 408 being shown. The six phases from the VCO are fed into a phase rotator 404 having 54 steps for a 2 bit time interval. The 54 steps are generated with a phase rotator having six phases with three inter-slice phase steps further divided by three.

The six outputs of the rotator 404 are buffered, and the edges are shaped to be able to sample a signal having twice the frequency. One of the phase outputs is used as local recovered clock 406. A clock buffer makes sure that it is not overloading the phase rotator. Timing analysis determines which phase is the optimum to use. The output section of the phase rotator suppresses common mode signals and performs a limiting signal.

The output is then driven out (with the signals from the phase rotator) to the phase buffers and to a sample latch complex 410 which in turn provides clocks. Six samples are taken over a two-bit interval. The sample latch complex is a CMOS, positive edge triggered latch. It takes differential data inputs and, with a single ended clock, outputs a single ended logic level signal. The complex consists of two circuits, the latch itself and a buffer that sharpens the output to the receive logic. The retiming latches 412 reduces the probability of a metastable state to a value much lower than the targeted bit error rate. It is also helping to align the data to one single clock phase. In order to be able to process information from more than one bit interval for the recovery of one data bit, a memory stage 414 reuses four samples from the previous sampling period. A total often samples is, therefore, fed into the half rate edge and data detection correlation blocks 416, 418, 420, 422 that make use of a pattern recognition algorithm. Truth tables represent the initial best guess for the data.

The outputs of the edge and data detection block are the recovered two bit and the early and late signals going to the phase rotator control state machine 426. This involves the use of a bang-bang control circuit with adaptive step size. The state machine can be viewed as a digital filter that evaluates the early and late signals and commands an adjustment of the sample point. The rotator counter and temperature code generator 424 generates the 54 control signals for the phase rotator, and this closes the clock and data recovery control loop.

The data path consists of a shift register 430 which loads two bits from the data correlation blocks during each half-rate cycle. The shift register is loaded to a word data register 432 (eight or ten bits) using a word clock derived from the PLL clock. A rate counter 434 monitors the shift register 430 and the eight/ten bit register 432.

The method for the phase rotator control is an advanced bang-bang state machine. It involves eight-fold initial early/late averaging. It has sixteen states and may be implemented using four latches. The state machine 426 has two inputs, one for early and one for late. The averaging effect is achieved in the following manner. The state machine is set to eight. If several early signals in a row, but not enough to drive the state to '1', are followed by several late signals, the state machine averages them out. However, when a preponderance of early or late signals takes the state machine to '1' or '14', the state machine determines that the sampling is occurring too early or too late and determines whether to change the sample point. The state machine produces a 'down' signal when it gets to a state '1' and an 'up' signal when it gets to a state '14'. This output signal from the state machine, if it is a 'down', instructs the rotation counter to adjust the sampling to a later point. Conversely, an 'up' signal will instruct the counter to adjust the sampling to an earlier point.

The bang-bang control state machine is followed by an up and down counter with 54 steps (requiring six flip-flops) for the receiver with sample processing. The counter has 54 steps and controls where the sample point will be. The counter processes two bits at a time in parallel. Thus, there are twenty-seven positions where the sample point can be set for each bit. That defines the limits of the resolution. As noted, the state machine determines whether to change the sample point and the counter determines where the new sample point will be.

Figure 5:
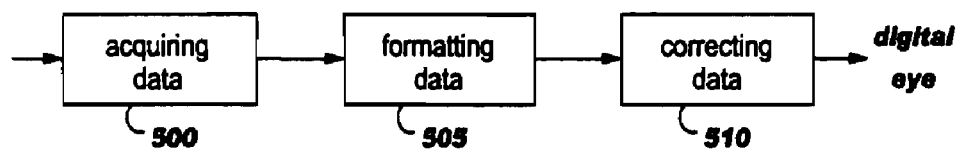
FIG. 5 shows the global algorithm of the method of the invention.

According to the method of the invention the data requested to construct the digital eye are sampled using the hardware described above so that it does not required further hardware feature. The only requirement consist in accessing the content of sample memory 414 and controlling the phase rotator 404. Thus, data are sampled using sample register 414, as illustrated by arrow 436, and the associated phase rotator 404 is 'disconnected' from the phase rotator control state machine 426 to be 'locked' and 'externally controlled', as illustrated by cross and arrow 438. FIG. 5 illustrates the general principle of the method. After having acquired the data (box 500), data are formatted (box 505) before being corrected (box 510) to construct the digital eye. These general steps are described in details by reference to FIGS. 6 to 10. For sake of illustration the phase rotator of the following description may reach 9 positions, varying from −4 to 4 (right to left).

Figure 6:
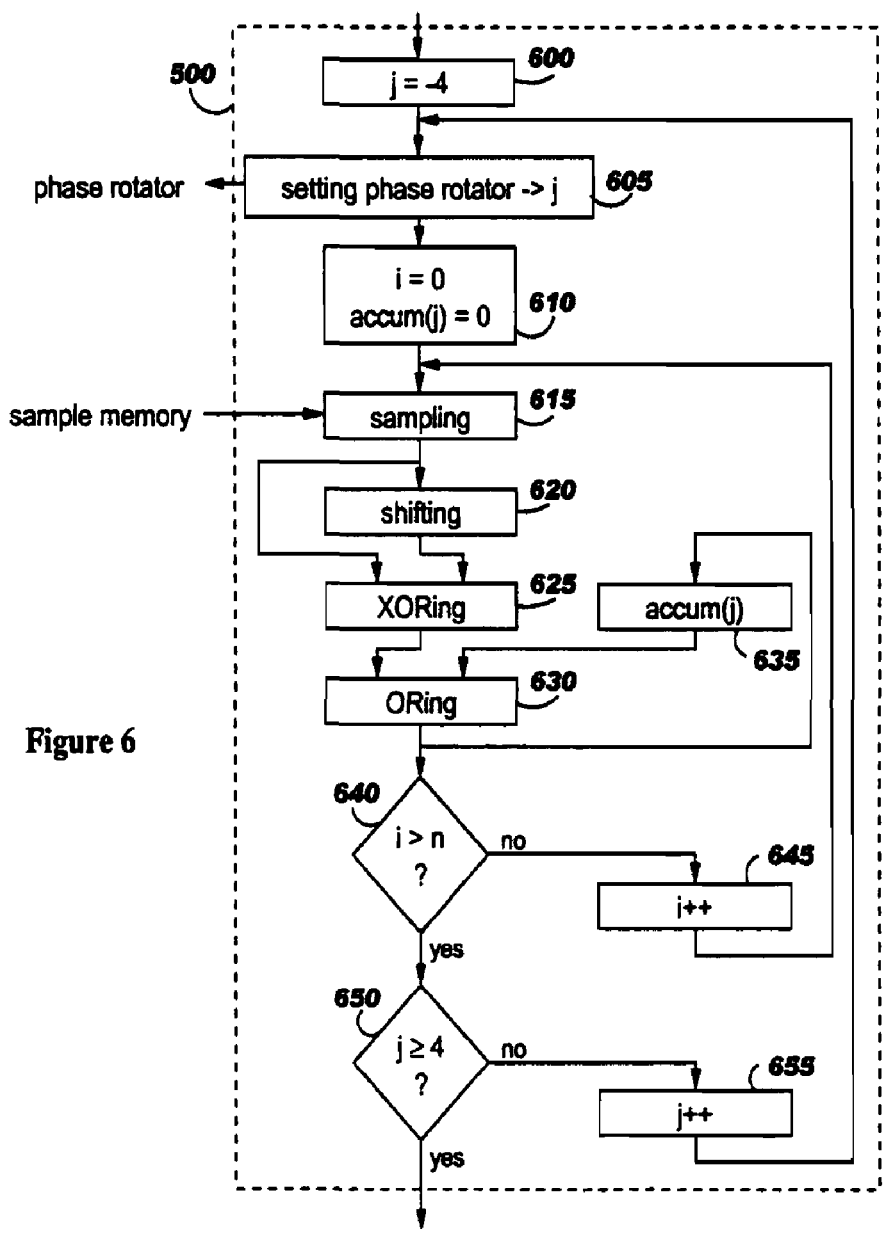
FIG. 6 represents an example of the algorithm used to acquire data according to the method of the invention.

FIG. 6 illustrates an algorithm example of the first step of the method, consisting in acquiring the data that are used to construct the digital eye. A first variable j, representing the phase rotator position, is set to its minimum value, i.e. −4 in this example (box 600) and the phase rotator is set to position j (box 605). Variable i and accum(j) are set to zero (box 610). The 10 bit sample register value is acquired from sampling unit (box 615) and shifted by one position to the right (box 620). The sample register value and the shifted sample register value are then XORed together (box 625), producing a 9 bit value, and the result is ORed with a cumulated value associated to phase rotator position j, initialized to zero (box 630). The OR result, or cumulated value, is stored in a table having as many memory cells as the number of phase rotator positions, at position j (box 635). Then a test is performed to determine whether or not enough sample register values have been used, i.e. to compare variable i with a predetermined threshold n (box 640). In practice, n must be great enough so as to detect many signal transitions, but not too large so as to avoid errors due to phase rotator skew. If variable i is not greater than n, variable i is incremented by one (box 645) and the last six steps (boxes 615 to 640) are repeated. Else if variable i is greater than n, a second test is performed to determined whether or not the phase rotator have been set to all its possible positions, i.e. variable j has reached its maximum value equal to 4 in this example (box 650). If variable j is less than 4, variable j is incremented by one (box 655) and last ten steps (boxes 605 to 650) are repeated. Else if variable j is greater than or equal to 4, the process is stopped.

The algorithm described by reference to FIG. 6 allows determination of values characterizing the edge positions of sampled signal, i.e. the positions wherein signal transitions have been detected at least once. According to this algorithm, a value equal to one means that an edge has been detected at least once at the corresponding position while value zero means that an edge has never been detected at the corresponding position.

FIG. 7a illustrates the relative positions wherein an edge analysis has been conducted, depending upon phase rotator position. FIG. 7b shows the table wherein the values determined in box 630 of FIG. 6 are stored.

Turning now to FIG. 7a, it illustrates the input signal to be sampled and the positions wherein edge analysis are conducted when the phase rotator is set successively to all the possible positions, i.e. when variable j varies from −4 to 4. The positions where edge analysis are conducted, referred to as analyzed positions, correspond to sampling positions, except for the ones at the utmost left due to the right shift performed in box 620 of FIG. 6. As it is apparent from this figure, the behavior of the input signal between two adjacent analyzed positions, for a particular position of the phase rotator, may be determined by analyzing results for the same analyzed positions for the other phase rotator positions. For example, the behavior of the input signal comprised in the time window determined by the first and the second analyzed positions when the phase rotator is set to position −4 (mark with an *), may be determined by using the 8 analyzed positions given by the first analyzed position for the other phase rotator positions (mark with a +).

The values resulting from the algorithm of FIG. 6 may be arranged in a table, as illustrated on FIG. 7b, wherein each row corresponds to a particular value of j, i.e. a particular position of the phase rotator, and each column corresponds to a bit position of the stored values. From this table, the acquired data may be formatted (step 505 of FIG. 5) to create a global value. This global value is constructed by merging bits of stored values according to the arrows illustrated on the drawing, i.e. by merging the bits of the stored values according to the position order of the analyzed position associated to these bits. In other words, this global value is the concatenation of the bits of the table from top to bottom and from right to left.

Thus, in this example, the global value is:
000001111111111111111111100000000001111111111111
000000000000001111111-111111111110000

FIG. 8 illustrates the algorithm used to format the acquired data, i.e. box 505 of FIG. 5. An initialization phase consists in setting variable i to zero, variable j to the number of bits of the acquired data minus one, i.e. 8 in this example, and the global value GV is emptied (box 800). Then, the bit having coordinates (i,j), variable i representing the row and variable j the column, of the table mentioned above wherein acquired values are stored, is concatenated to GV, at the utmost right (box 805). A test is performed to determine if variable i has reached the last row (box 810), i.e. if variable i is equal or not to 8 in this example. If variable i has not reached the last row, i.e. if variable i is not equal to 8, variable i is incremented by one (box 815) and the last two steps (boxes 805 and 810) are repeated. Else, if variable i has reached the last row, i.e. if variable i is equal to 8, a second test is performed to determine whether or not variable j has reached the first column (box 820), i.e. variable j is equal to 0 or not. If variable j has not reached the first column, i.e. if variable j is not equal to 0, variable i is set to zero and variable j is decremented by one (box 825), the last four steps (boxes 805 to 820) are repeated. Else, if variable j has reached the first column, i.e. if variable j is equal to 0, the process is stopped, the global value GV is constructed.

As mentioned above, bit values 0 and 1 may be replaced by '-' and 'X', respectively, for sake of clarity to obtain the following result:

-----XXXXXXXXXXXXXXXXXX---------XXXXXXXXXXXXX----

---------XXXXXXXX-XXXXXXXXXX----

At this stage a correction is required due to the principle of the method. As mentioned above, 81 sample values are used to construct the digital eye however, only 9 values are sampled each time, i.e. 9 values are sampled for a particular position of the phase rotator. As a consequence, edges are detected too early as illustrated on the example of FIG. 9.

Figure 9:
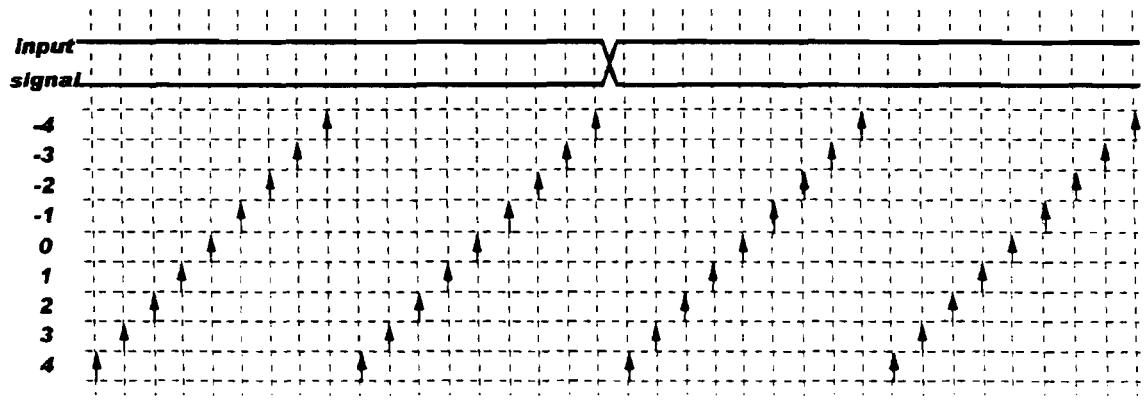
FIG. 9 illustrates the error introduced by the method of the invention in the digital eye.

FIG. 9 illustrates a signal sampling, wherein only 4 values are sampled at a time for sake of clarity. Using the input signal values, the edge position may be detected for phase rotator position −4 by determining the sampled value, shifting this sampled value of 1 to the right and XORing these values as follows:

sampled value: X X {overscore (X)} {right arrow over (X)}
shifted sampled value: . X X {overscore (X)}
XOR(−4) . 0 1 0

The same may be done for phase rotator position −3, −2 and so on until phase rotator position 4, that conducts to the following XOR results:

XOR(−3): . 0 1 0
XOR(−2): . 0 1 0
XOR(−1): . 0 1 0
XOR(0): . 0 1 0
XOR(1): . 0 1 0
XOR(2): . 0 1 0
XOR(3): . 0 1 0
XOR(4): . 0 1 0

Thus, the global value is
000000000111111111000000000 wherein the first value equal to 1 corresponds to the position of the third sampled bit of phase rotator position −4 and the last value equal to 1 corresponds to the position of the third sampled bit of phase rotator position 4.

As mentioned above, this global value may be transformed to obtain a more readable "signal", as follows:

---------XXXXXXXXX---------

However, it is noticeable from FIG. 9 that signal transitions have not been detected at each positions between the position of the third sampled bit of phase rotator position −4 and the position of the third sampled bit of phase rotator position 4 but only after the position of the third sampled bit of phase rotator position 4. Thus, the correction consists in removing the eight false detection detected too early. The digital eye of the example of FIG. 9 is:

---------X----------------- showing that the signal transition takes place before the position of the third sampled bit of phase rotator position 4.

Now turning back to the example of FIG. 7b for which the transformed global value is:

-----XXXXXXXXXXXXXXXXXX---------XXXXXXXXXXXXX----

---------XXXXXXXX-XXXXXXXXXX---- the correction consisting in removing the eight false detection detected too early gives the following digital eye:

-----XXXXXXXXXX-----------------XXXX-------------

---------XXXXXXXX-XX------------

Figure 10:
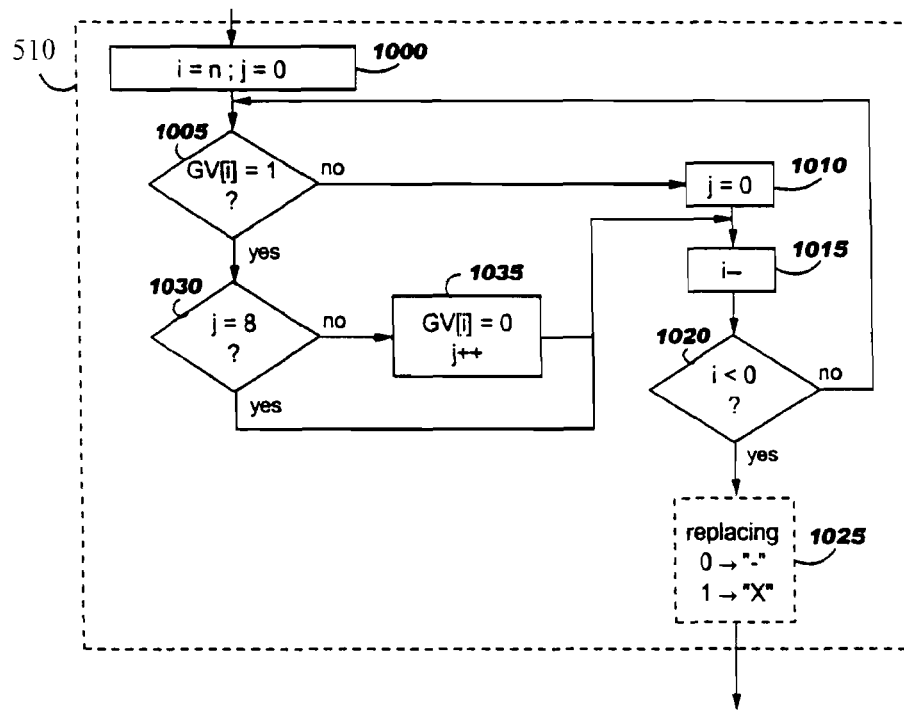
FIG. 10 represents an example of the algorithm used to correct formatted data.

FIG. 10 illustrates the algorithm used to correct the global value, i.e. box 510 of FIG. 5. A first step consists in initializing variables i and j (box 1000), variable i is set to n, the number of bit of the global value GV and variable j is set to zero. A first test is performed to determine whether or not the bit i of global value GV (GV[i]) is equal to one (box 1005). If GV[i] is not equal to one, variable j is set to zero (box 1010), variable i is decremented by one (box 1015) and a second test is performed to determine whether or not variable i is inferior to zero, i.e. if all the bits of global value GV have been examined (box 1020). If variable i is equal to or greater than zero, the process is repeated from box 1005 to test new bit GV[i]. Else if i is inferior to zero, the process is stopped, the digital eye has been constructed. However, a further optional step may consists in replacing values zero by "-" and one by "X" as described above (box 1025). If GV[i] is equal to one (box 1005), another test is done to determine whether or not variable j is equal to the number of positions reached by the phase rotator minus one i.e., 8 in this example (box 1030). If variable j is not equal to 8, the ith bit of global value (GV[i]) is set to zero, variable j is incremented by one (box 1035) and the process is branched to box 1015 described above. Else if variable j is equal to 8, the process is directly branched to box 1015.

Thus, at the end of the process described by reference to FIG. 10, the digital eye is constructed and may be either a sequence of zero and one, a sequence of "-" and "X" or a sequence of other symbols replacing values zero and one. This digital eye shows the positions wherein signal transition have taken place.

Figure 11:
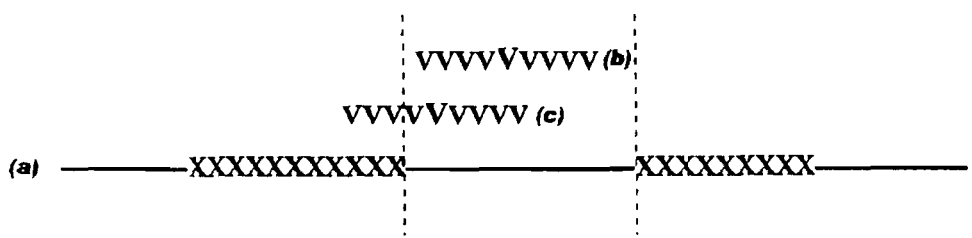
FIG. 11 shows how to determine if sampled values are correct or may be false.

As mentioned above, the phase rotator is locked during the construction of the digital eye. The main consequence is that, if the system is used during the construction of the digital eye, a sampling value may be false since the phase rotator is not automatically adjusted. Since the position of the phase rotator is moved from 4 positions to the right to 4 positions to the left, the validity of the sampled value may be determined by comparing a window of 9 positions wherein signal may be sampled, centered on the sampling position that is automatically determined by the phase rotator before it is externally controlled, with the digital eye. If the 9 position window overlaps a position wherein at least one signal transition has been detected, sampled value may be false else, if the 9 position window does not overlap a position wherein at least one signal transition has been detected, the sample value is correct, as illustrated on FIG. 11 wherein curve (a) is a digital eye and curves (b) and (c) represent the 9 position window without overlapping and with overlapping, respectively. The bigger 'V' shows the sampling position that is automatically determined by the phase rotator before it is externally controlled and the other 'V' illustrate the positions examined when the method of the invention is conducted.

If the quality of the high-speed signal may be determined by analyzing the digital eye, it is also important to take into account the behavior of the phase rotator. Since the high-speed signal transmitter and receiver are using a 'common' clock, the phase rotator is supposed to be stable after the bit synchronization. Nevertheless, this stability may be altered, if the incoming signal presents a 'high frequency' jitter (a constant phase rotator adjustment is required)

if the incoming signal presents a 'low frequency' jitter (the phase rotator must be regularly adjusted);

if the incoming signal presents a phase shift due, for example, to temperature variation (the phase rotator must be permanently or regularly adjusted).

In such cases, the aspect of the digital eye may be perturbed by the lack of phase tracking (the phase rotator is locked and externally controlled when constructing the digital eye) and so, the digital eye may be closer than the reality.

For these reasons, it is necessary to perform an evaluation of the phase rotator behavior before constructing the digital eye. To that end, the position of the phase rotator is periodically analyzed e.g., by reading value of phase rotator 428 of FIG. 4 as illustrated by arrow 440. These values may be stored and arranged as a graphic characterizing the phase rotator position distribution. This graphical representation of phase rotator position behavior may also be used to determine the best position to lock the phase rotator when constructing the digital eye.

Figure 12:
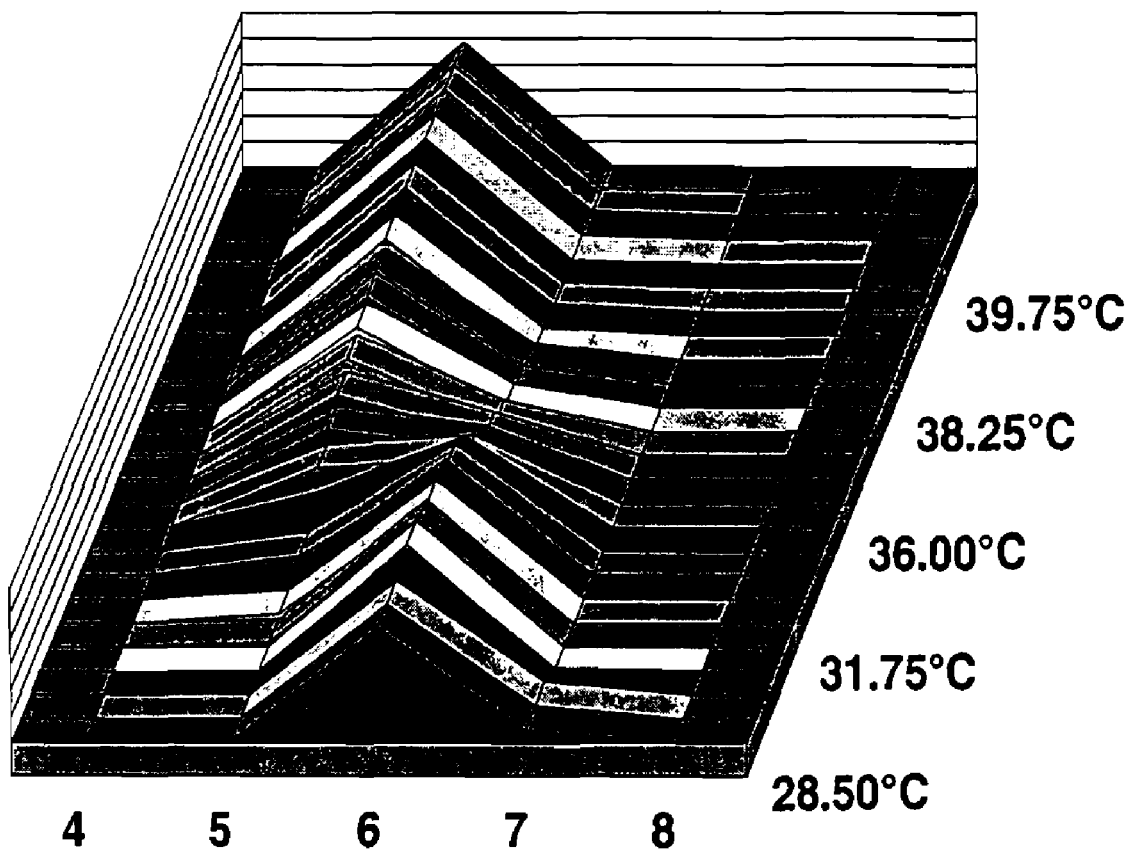
FIG. 12 shows a graphic illustration of an example of phase rotator behavior when temperature varies.
Figure 13:
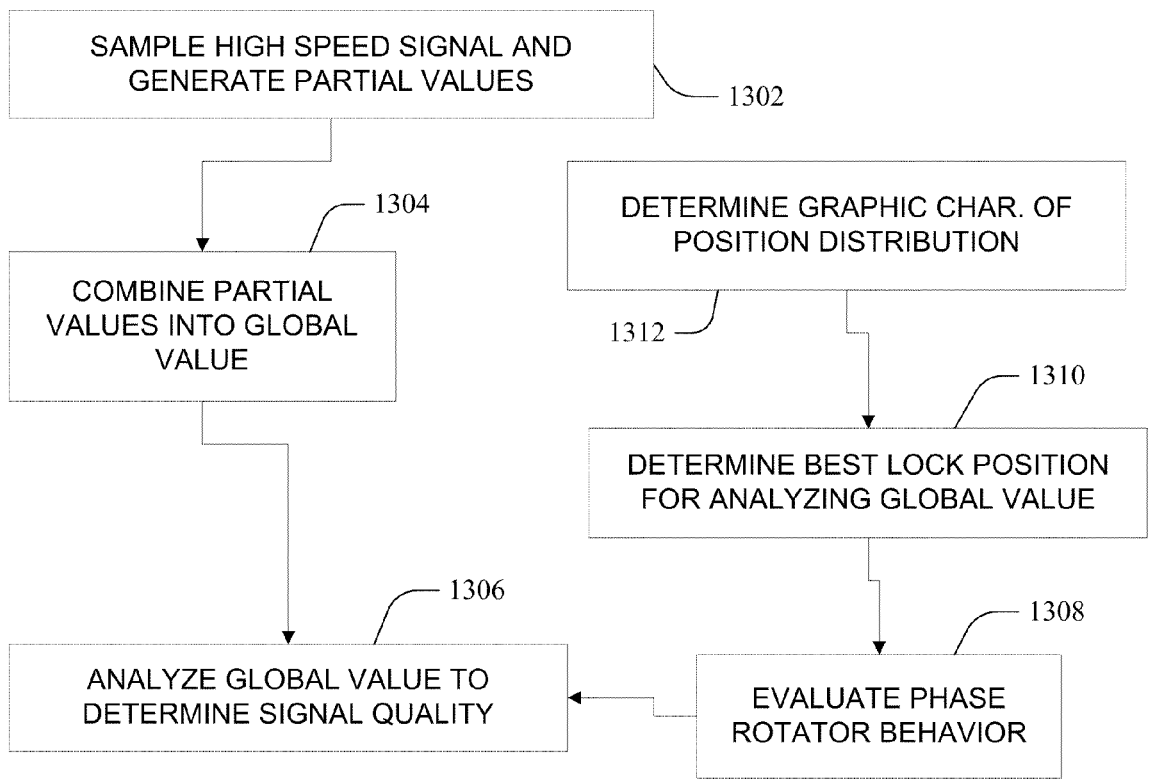
FIG. 13 illustrates a method for analyzing the quality of a high-speed signal according to the present application.

FIG. 12 illustrates an example of phase rotator behavior when temperature varies. X axis represents the position of the phase rotator, Y axis represents the temperature and Z axis represents the statistical distribution of the phase rotator position. Two movements are combined in this figure, a low frequency jitter due to the incoming signal and the phase shift due to the temperature.

Naturally, in order to satisfy local and specific requirements, a person skilled in the art may apply to the solution described above many modifications and alterations all of which, however, are included within the scope of protection of the invention as defined by the following claims.

We claim:

1. A method for analyzing a high speed signal comprising:
    simultaneously sampling the high speed signal an N plurality of times during a sampling clock period at each of a plurality of phase rotator positions to generate a plurality of partial values, wherein N subset pluralities of the partial values are each associated to each one of the plurality of phase rotator positions;
    combining said partial values into a global value; and
    analyzing the global value to determine a quality of the high speed signal.

2. The method of claim 1, further comprising evaluating phase rotator behavior, wherein analyzing the global value to determine the quality of the high speed signal is performed responsive to an evaluation of the phase rotator behavior.

3. The method of claim 2, wherein evaluating phase rotator behavior comprises:
    reading a plurality of phase rotator values over a time period;
    determining a graphic characterization of a phase rotator position distribution from the plurality of phase rotator values; and
    determining a best position to lock a phase rotator when analyzing the global value to determine the quality of the high speed signal.

4. The method of claim 1, further comprising:
    setting a phase rotator to all its possible positions; and
    determining a partial value for each of the possible phase rotator positions;
    wherein the step of combining said partial values into the global value comprises combining all of said partial values into the global value.

5. The method of claim 4 wherein simultaneously sampling comprises sampling several hundreds of times for each position of said phase rotator.

6. The method of claim 5 wherein analyzing the global value further comprises:
    correcting the global value to generate a corrected global value, and
    analyzing the corrected global value.

7. The method of claim 6, wherein the step of analyzing the corrected global value further comprises:
    constructing a digital eye from the corrected global value; and
    analyzing the digital eye to determine the quality of the high speed signal.

8. The method of claim 5, further comprising storing the partial values as a table entry having a common number of bits, a table entry row corresponding to the partial value phase rotator position and a table entry column corresponding to a partial value bit position; and
    wherein the step of combining said partial values into the global value comprises merging stored partial value bits according to a table storage order.

9. The method of claim 8, further comprising merging stored partial value bits into the global value by concatenating the stored bits in an order from a table top to a table bottom and from a table right to a table left.

10. The method of claim 9 wherein concatenating comprises:
    initializing a global value and a row variable I to zero;
    setting a column variable J to a common number of bits;
    concatenating a partial value bit having a table coordinate (I, J) to the global value;
    if row variable I is not a last table row:
        incrementing the row variable I;

concatenating a partial value bit having a table coordinate (incremented I, J) to the global value; and repeating the steps of incrementing the row variable I and concatenating the partial value bit having the table coordinate (incremented I, J) until the row variable I is the last table row; and if row variable I is the last table row and variable J is not equal to zero:

initializing the row variable I to zero;

decrementing the column variable J by one;

concatenating a partial value bit having the table coordinate (I, decremented J) to the global value; and repeating steps of incrementing the row variable I, and concatenating a partial value bit having the table coordinate (incremented I, decremented J) to the global value for each value of variable J until variable J is equal to zero.

* * * * *